(12) United States Patent
Aziz et al.

(10) Patent No.: US 6,556,305 B1
(45) Date of Patent: Apr. 29, 2003

(54) PULSED SOURCE SCANNING INTERFEROMETER

(75) Inventors: David J. Aziz, Tucson, AZ (US); Robert E. Knowlden, Tucson, AZ (US); Matthew P. Abbene, Oro Valley, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 0 days.

(21) Appl. No.: 09/505,500

(22) Filed: Feb. 17, 2000

(51) Int. Cl.[7] .................................................. G01B 9/02
(52) U.S. Cl. ...................................... 356/512; 356/497
(58) Field of Search ................................ 356/497, 511, 356/512

(56) References Cited

U.S. PATENT DOCUMENTS 5,706,084 A    1/1998 Gutierrez
5,706,085 A  * 1/1998 Blossey et al. ............. 356/512

* cited by examiner

Primary Examiner—Samuel A. Turner
Assistant Examiner—Patrick Connolly
(74) Attorney, Agent, or Firm—Antonio R. Durando; Durando Birdwell & Janke, PLC

(57) ABSTRACT

A pulsed light source in used conjunction with a ramping scanning mechanism for phase-shift and vertical-scanning interferometry. The pulse length and the scanning velocity are selected such that a minimal change in OPD occurs during the pulse. As long as the duration of the pulse is shorter than the detector's integration time, the effective integration time and the corresponding phase shift are determined by the length of the pulse, rather than the detector's characteristics. The resulting minimal phase shift produces negligible loss of fringe modulation, thereby greatly improving signal utilization during phase-shifting and vertical-scanning interferometry.

14 Claims, 6 Drawing Sheets

PULSED SOURCE SCANNING INTERFEROMETER

BACKGROUND OF THE INVENTION

1. Field of the Invention

This invention is related in general to the field of scanning interferometry and, in particular, to an improved approach for signal acquisition by utilizing a pulsed light source.

2. Description of the Related Art

As well understood in the art of phase shifting and vertical scanning interferometry, the optical path difference (OPD) between a test beam and a reference beam is varied in order to make a measurement. This is typically accomplished by shifting either the test surface or the reference surface of the interferometer axially by a predetermined distance during or between times of acquisition of data frames. The shift is normally carried out in steps or by continuous motion at a known, ideally constant, speed.

In the stepping method, the sample surface (or, alternatively, the reference surface) is moved between data frames and held still during data acquisition; thus, the OPD is kept constant during acquisition of each data frame. In practice, the shift-and-hold motion of the stepping method is mechanically undesirable because a finite amount of time is required for the shifted portion of the apparatus to settle into a static condition, thereby slowing down the process of data acquisition. Therefore, this method is no longer generally preferred in the industry.

In the ramping method, the OPD is varied in a continuous, smooth fashion, typically by scanning either the sample surface or the reference surface at constant speed throughout the measurement sequence. This approach is more common for phase shifting and vertical scanning interferometry because it allows faster measurements than the stepping method. On the other hand, this approach has the disadvantage of continuously varying the OPD, which, in conjunction with the finite integration time required for the detector to acquire an adequate signal, necessarily results in a reduction of the detected fringe modulation signal with respect to the modulation of the light incident on the detector. This decreases the signal-to-noise ratio of the resulting data with a corresponding significant loss of measurement accuracy.

The reduction in the detected fringe modulation signal due to the detector's integration time is well understood in the art and can be quantified analytically by the following equation:

$$I_{det}(x,y) = I_{inc}(x,y)\{1 + \gamma_{inc}(x,y) \operatorname{sinc}(\Delta/2\pi)\cos[\phi(x,y)+\alpha_i]\} \quad (1)$$

where $I_{det}(x,y)$ is the intensity of the detected signal at the x,y pixel; $I_{inc}(x,y)$ is the average intensity of the light signal incident on the detector over the detector's integration time; $\gamma_{inc}(x,y)$ is the fringe modulation of the light incident on the detector; $\Delta$ is the phase shift, in radians, during the integration time; $\phi(x,y)$ is the phase of the wavefront being measured; $\alpha_i$ is the average phase shift occurring during the frame time of data acquisition; and $\operatorname{sinc}(\Delta/2\pi) = \sin(\Delta/2)/(\Delta/2)$.

Based on Equation 1, it is clear from the effect of the variable $\Delta$ that the ramping method of scanning produces a reduction in the detected fringe modulation of the light incident on the detector by the factor $\operatorname{sinc}(\Delta/2\pi)$. As illustrated in functional form in the plot shown in FIG. 1, longer integration times and correspondingly larger phase shifts produce greater reductions in the detected fringe modulation intensity. It is noted that Equation 1, which is written for a two-dimensional detector array (x,y), would apply in similar form to detectors of other dimensions, such as linear detector arrays.

The effect of the phase shift taking place when scanning is continued during the detector integration time is illustrated by the following table for phase shifts of $\pi/4$, $\pi/2$, $3\pi/4$ and $3\pi/2$, with a detector having an integration time of 33.3 milliseconds.

TABLE 1

| Case | $\Delta$ | sinc $(\Delta/2\pi)$ | Measurement Conditions |
|---|---|---|---|
| 1 | $\pi/4$ | 0.97 | Rate of change of OPD = 3.75 wavelengths/second. Detector integration time = (1/30) second = 0.033 seconds. |
| 2 | $\pi/2$ | 0.90 | Rate of change of OPD = 7.5 wavelengths/second. Detector integration time = (1/30) second = 0.033 seconds. |
| 3 | $3\pi/4$ | 0.78 | Rate of change of OPD = 11.25 wavelengths/second. Detector integration time = (1/30) second = 0.033 seconds. |
| 4 | $3\pi/2$ | 0.30 | Rate of change of OPD = 22.5 wavelengths/second. Detector integration time = (1/30) second = 0.033 seconds. |

For simplicity of illustration, assuming $\gamma_{inc}(x,y)$ is equal to one (that is, the reference and test beams have exactly the same intensity), FIG. 2 shows the fringe modulation of the incident light and FIG. 3 the fringe modulation of the detected signal for the case where $\Delta=3\pi/2$ (Case 4), for example. In the case of white light, the fringe modulation shown in FIGS. 2 and 3 will also vary to some degree across the range of OPDs shown (i.e., it is maximum at zero OPD). The reduced modulation of the detected signal illustrates the loss of modulation resulting from the finite integration time of the detector. Thus, it is clear that this loss of signal is an undesirable consequence of the ramping method of scanning. This invention provides a procedure and apparatus for eliminating this inefficiency and improving the overall data gathering function of the instrument.

BRIEF SUMMARY OF THE INVENTION

One primary objective of this invention is a method and apparatus for reducing the loss of signal produced by the finite integration time of detectors during phase-shifting and vertical-scanning interferometric measurements utilizing the ramping method of scanning.

Another important goal of the invention is a method and apparatus that improve data acquisition without reducing the scanning speed of the instrument.

Another objective of the invention is a procedure that can be implemented in conjunction with conventional feed-back loop control algorithms and/or hardware.

Still another objective is a method and apparatus that are suitable for incorporation within existing instruments.

A final objective is a procedure that can be implemented easily and economically according to the above stated criteria.

Therefore, according to these and other objectives, the preferred embodiment of the present invention consists of utilizing a pulsed light source in conjunction with a ramping scanning mechanism for phase-shift and vertical-scanning interferometry.

The pulse length and the scanning velocity are selected such that a minimal change in OPD occurs during the pulse. As long as the duration of the pulse is shorter than the detector's integration time, the effective integration time and the corresponding phase shift are determined by the length of the pulse, rather than by the detector's characteristics. The resulting minimal phase shift produces negligible loss of fringe modulation, thereby greatly improving signal utilization during phase-shifting and vertical-scanning interferometry.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The present invention consists of a single inventive concept, the realization that the signal loss resulting from the finite integration time of light detectors can be minimized by utilizing a pulsed light source of sufficient intensity to produce a significantly detectable signal on the detector's surface. By using a sufficiently short pulse length and synchronizing the source and the integration time of the detector, an effectively instantaneous integration time can be achieved, during which a negligible phase shift occurs and a correspondingly negligible loss of signal is experienced. As used herein, "synchrony" between the pulsed emission of radiation and the detector's integration time is intended to mean a condition whereby at least a portion of the pulsed wavefront is received by the detector while it is integrating the incident signal. Such condition is also referred to as one of "contemporaneous" light-intensity measurement of the pulsed signals.

Figure 1:
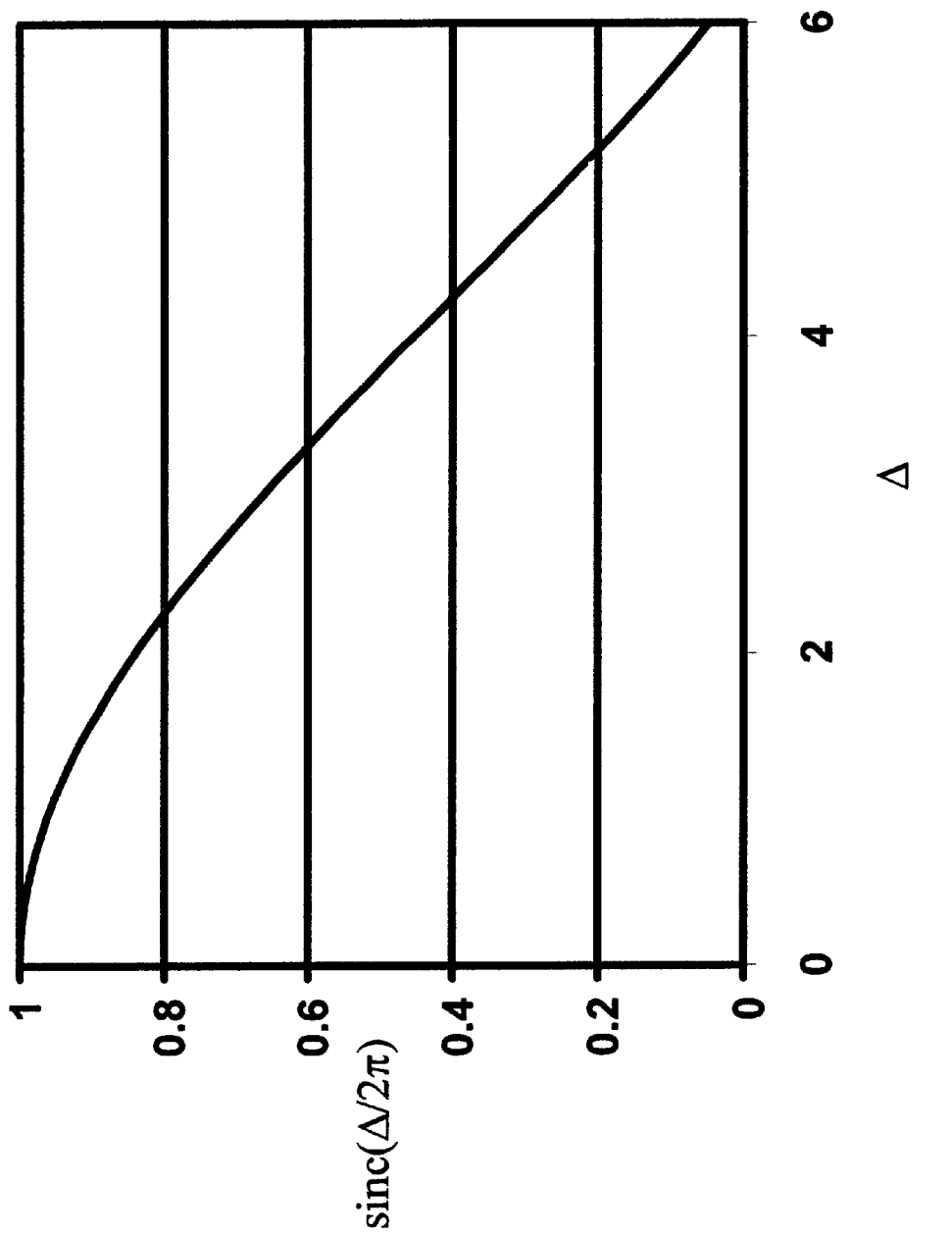
FIG. 1 is a plot illustrating the functional form of sin c($\Delta/2\pi$).
Figure 2:
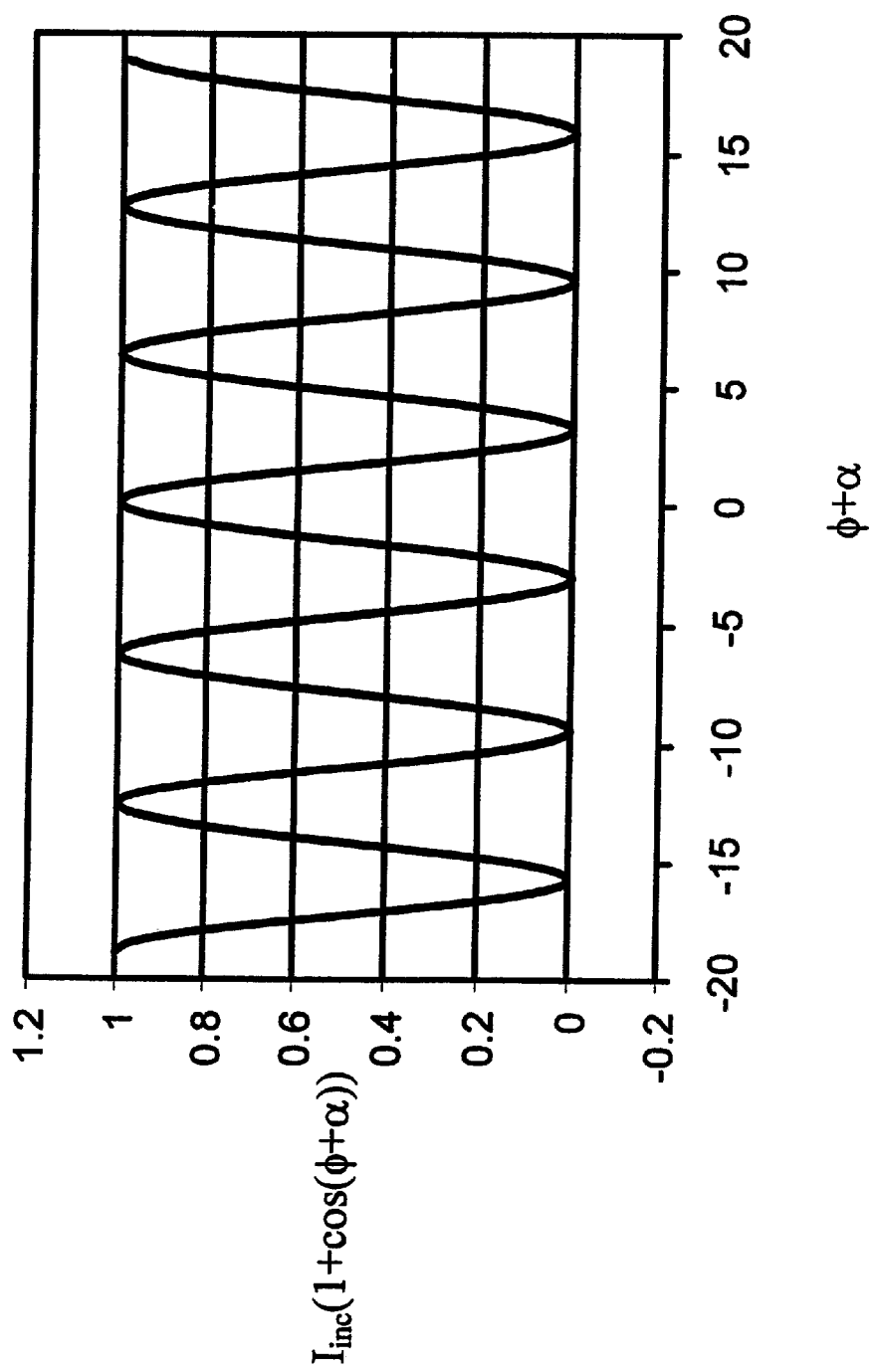
FIG. 2 shows the modulation intensity as a function of OPD of incident light on a detector in the ideal case of maximum fringe modulation.
Figure 3:
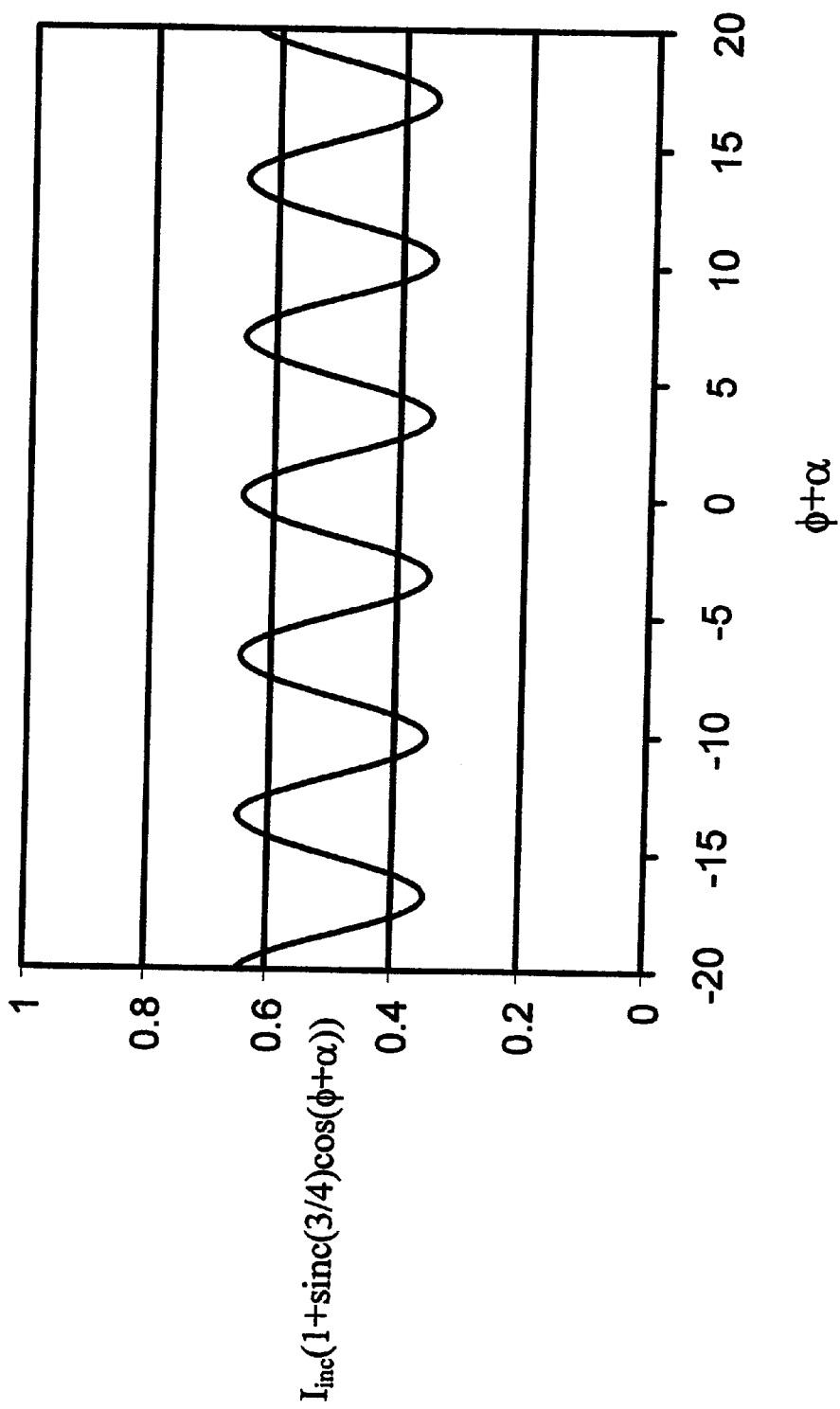
FIG. 3 shows the modulation intensity as a function of OPD of detected light on a detector in the case of a ramping scanning mechanism where the fringe modulation has been reduced by the finite detector integration time.
Figure 4:
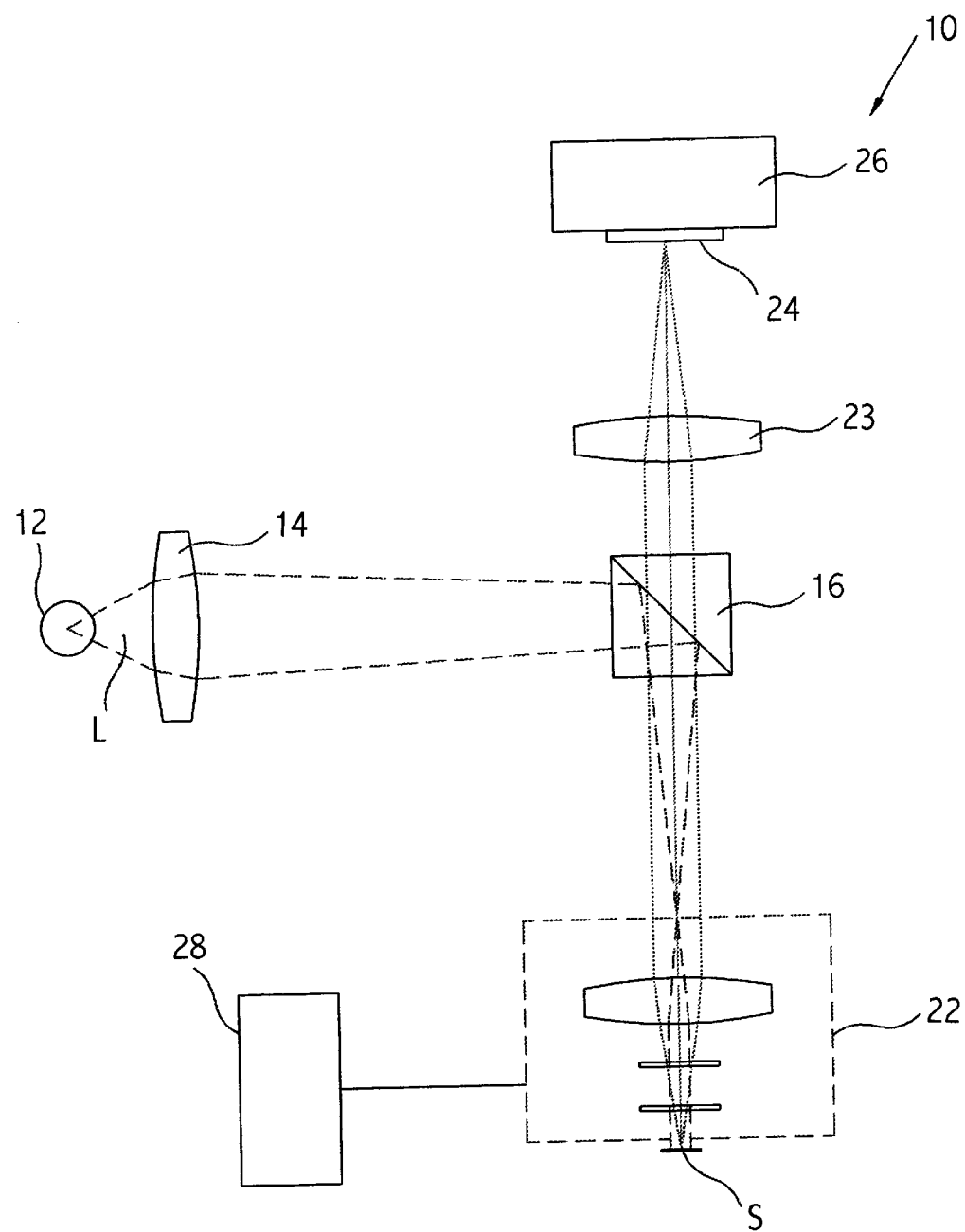
FIG. 4 is a simplified schematic representation of a scanning interferometer according to prior art.

Referring to the drawings, wherein like parts are designated throughout with like numerals and symbols, FIG. 4 illustrates typical interferometric equipment 10 that comprises a continuous-output light source 12 directing a beam L of light through a conventional illuminator 14 toward a bean splitter 16, which reflects the light in the direction of a test surface S. The light reflected by the beam splitter 16 is focused, ideally, in the entrance pupil of a microscope objective 22. This is known in the art as Kohler illumination, which produces approximately even illumination of the test surface S. The light then passes through the microscope objective 22 onto the test surface S. The objective 22 incorporates an interferometer (such as Mirau), so that two light beams are generated for producing interference fringes as a result of the optical path difference between the reference surface and the test surface S. The beams reflected from the reference surface and the test surface. S pass back up through the microscope objective 22 and upward through the beam splitter 16 and an imaging lens 23 to a solid-state imaging array 24 positioned in a camera 26 in coaxial alignment with the objective 22. The imaging array 24 typically consists of individual charge-coupled-device (CCD) cells or other sensing apparatus adapted to record a one- or two-dimensional array of signals corresponding to interference effects produced by the interferometer as a result of light reflected from the reference surface and from individual x-y coordinates or pixels in the surface S and received at corresponding individual cells in the array. Appropriate electronic hardware (not shown) is provided to process the signals generated by each cell and transmit them to a computer for further processing. Thus, an interference-fringe map is generated by detecting the intensity of the light signal received in each cell of the array 24.

It is noted that the embodiments of the present invention are described with reference to x, y and z orthogonal coordinates wherein x and y define a horizontal plane and z defines a vertical direction, but it is obvious that the structure and operation of the features detailed herein could be rotated in any direction with equivalent results. It is also understood that the various components shown in the drawings are not drawn to relative scale, but they are represented only schematically for illustration.

In scanning interferometry, a profile of the surface S is commonly produced by repeating the measurement at different, constant-interval distances (or, similarly, at constant-time scanning intervals) between the objective 22 and the test surface S (that is, at different elevations produced by a scanning mechanism 28), so as to provide information concerning the variation of light intensity at each pixel as the corresponding optical path difference is varied systematically with respect to an initial reference point. In phase shifting interferometry, three or more measurements of the light intensity at a pixel of a receiving sensor array 24 are used to determine the relative phase of the light reflected from the point on the test surface S corresponding to that pixel with respect to the other points on the test surface. Based on such measurements at each pixel of coordinates x and y, a phase distribution map $\Phi(x,y)$ can be determined for the test surface, from which very accurate height data h(x,y) are calculated in relation to the wavelength $\lambda$ of the light source used by the following general equation:

$$h(x, y) = \frac{\lambda}{4\partial}\Phi(x, y). \tag{2}$$

The scanned position corresponding to maximum interference at each pixel is determined and used, based on the distance from the reference point, to calculate the height of the surface at that pixel. Therefore, either the objective 22 or the test surface S is moved vertically to produce these repeated measurements (vertical scanning). It is noted that the present description is based on the configuration of a Mirau interferometer but, as one skilled in the art would readily understand, it is equally applicable to any of the other instruments used in vertical scanning interferometry, such as Michelson, Linnik or Fizeau.

During vertical scanning of the sample surface, the scanning mechanism (PZT-driven or motorized, for example) is controlled to quickly reach a predetermined scanning speed and then move at constant velocity through the scanning range of operation. As those skilled in the art readily understand, the scanning mechanism is easily controlled by either closed-loop control techniques (such as by linear-variable-differential-transformer position sensing—LVDT) or by open-loop configurations. Typically LVDT measurements are taken periodically during scanning to control the speed through a feed-back loop to ensure nearly perfect linear behavior of the translation mechanism. Based on the constant speed of motion of the scanner, its vertical distance relative to an initial datum is known after each subsequent time interval. Thus, light-intensity frames taken at predetermined time or spatial intervals can be associated with corresponding relative vertical positions to calculate surface heights at each pixel. It is noted that each height measurement is predicated upon relative elevations produced by the scanning mechanism during scanning, rather than upon absolute values, and that the precision of the measurements is critically dependent upon the linear behavior of the scanning device during its vertical translation.

Thus, while scanning in the z direction over the surface being tested, it is important to move the scanning portion of the device at constant speed as rapidly as possible in order to optimize the data acquisition function of the instrument, which produces the signal-loss problems addressed by this invention. Hence, a viable solution consists of replacing the continuous-output light source 12 with a pulsed source 30, such as a laser, an LED, a Xenon arc lamp, a superluminescent diode, or other equivalent source, as illustrated schematically in FIG. 5. The pulsed light source 30 is selected to have a pulse length sufficiently short to produce a minimal change in OPD during the pulse. In such case, the integration time of the signal received by the detector and $\Delta$ are determined by the length of the pulse, rather than the detector's integration time. For example, a pulsed LED with a pulse duration of 3.3 milliseconds used with a scanner producing an OPD rate of change of 23.8 wavelengths per second will yield a phase shift of $0.16\pi$ during the effective integration time at the detector (i.e., during the 3.3-ms duration of the pulse). At such very low value of $\Delta$, sin $c(\Delta/2\pi)$ is essentially equal to one, and a negligible loss of fringe modulation results (see Equation 1). Under conditions similar to those of Case 4, reported in Table 1 above, using a pulsed light source 30 instead of a conventional continuous-output light source 12, the device 32 of the invention increased the intensity of the detected fringe modulation from 29% to essentially 98% of the incident light fringe modulation. Thus, the invention makes it possible to use the ramping mode of scanning without the usual negative effect of reduced fringe modulation.

Obviously, the operation of the source 30 and the detector 24 need to be synchronized so that pulses are generated while the detector is integrating the light incident upon it. In one embodiment of the invention, a single pulse occurs during each detector frame (defining "frame" as the time during which the detector is periodically integrating the incident signal) and the pulses are emitted at preferably uniform temporal intervals. Given the current state of the art, extremely precise scan distances between data frames can be obtained with a scanning mechanism. In another implementation, a position detection mechanism is used to determine precisely the scan position and the pulse emission is triggered at controlled, preferably uniform, spatial intervals. This approach is similar to a closed-loop positioning system, such as the LVDT approach described above, but, rather than using position feedback to optimize the scanning motion, it is used (or it is also used) to determine the correct time to trigger the light pulse and thereby acquire each frame of data. It is noted that the uniform-time interval approach is easier to implement in practice and is typically preferred and used in commercial instruments, but the uniform-space interval approach allows the use of a less sophisticated scanning mechanism.

Figure 5:
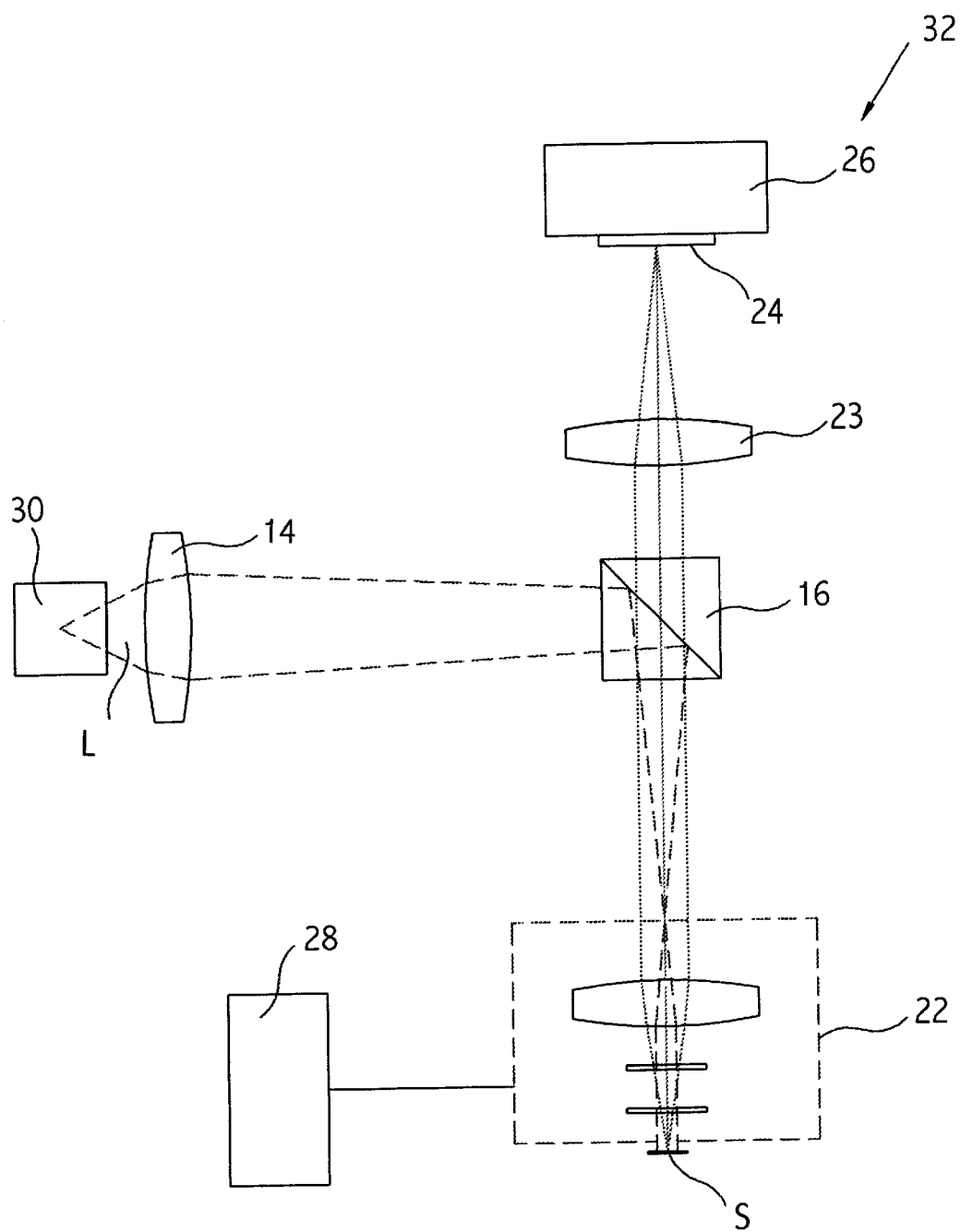
FIG. 5 is a simplified schematic representation of a scanning interferometer according to the present invention.
Figure 6:
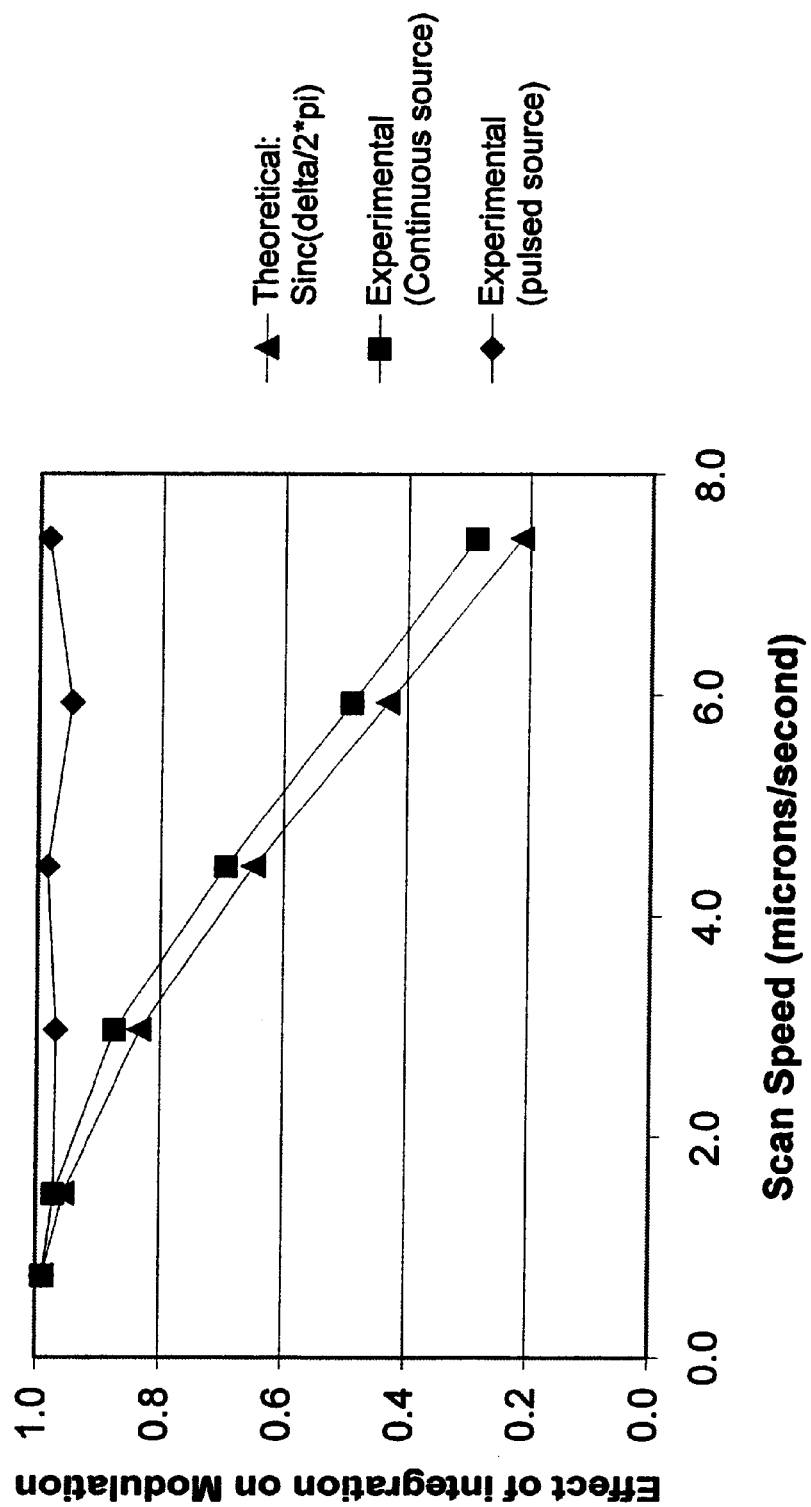
FIG. 6 shows the effect of finite integration time on the detected fringe modulation and the result of using a pulsed source to overcome this effect.

The invention was tested using a modified WYKO HD 3300 (manufactured by Veeco Metrology of Tucson, Arizona). FIG. 6 shows the fringe contrast generated by the same instrument when using a continuous source and when using the pulsed source of the invention, as well as the sin $c(\pi/2\pi)$ behavior predicted by Equation 1. The effect of finite integration time on detected fringe modulation is shown as a function of the scan speed. In the system of FIGS. 4 and 5, the test beam is reflected from the sample and returns through the objective to the detector. In this case, termed double pass, the OPD varies at twice the rate of the scan. For the continuous source, a 20 Watt halogen lamp and a 33 millisecond integration time was used. The effect on fringe modulation at even moderate scan speeds is severe, resulting in a reduction of the detected fringe modulation to approximately 29% of the incident fringe modulation (approximated by normalizing the data to that obtained with a very slow scan rate producing negligible loss of modulation). The measured data show slightly less reduction in fringe modulation with increasing scan speed than that predicted by the sin $c(\Delta/2\pi)$ relationship predicted in Equation 1. For the pulsed source case, an LED was driven with a pulse generator, which was in turn synchronized to the camera. A duty cycle of 10% was used (i.e., the LED was emitting 10% of the time), producing a pulse length of 3.33 milliseconds. There was no detectable reduction fringe modulation for scan speeds up to 7.4 microns/second (which corresponds to a phase change rate of 23.8 wavelengths/second).

It is understood that the advantages of the invention could be obtained also by using a very powerful continuous light source in conjunction with a detector with an integration time sufficiently short to produce negligible phase shift for a given scanning speed. A maximum phase shift on the order of $\pi/2$ radians would generally be considered acceptable. In practice, though, a continuous light source of sufficient power would have a very limited life and/or produce excessive heat; therefore, it would not be suitable for use in an interferometer.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of reducing loss of fringe modulation during interferometric measurements of a test surface of an object, comprising the following steps:

(a) emitting a pulsed light wavefront;
   (b) spitting the pulsed light wavefront into a test beam directed to the test surface and a reference beam directed to a reference surface;

(a) producing multiple optical path differences between the reference beam and the test beam;

(d) detecting a combination of wavefronts reflected from the reference surface and the test surface on a light-intensity sensor having a predetermined integration time; and (e) synchronizing the emission of said pulsed light wavefront of step (a) with the integration time of the sensor;

wherein said pulsed light wavefront is emitted using a pulse length corresponding to a maximum phase shift of about $\pi/2$ radians during said integration time of the light-intensity sensor; and wherein the pulsed light wavefront is characterized by a constant amplitude.

2. The method of claim 1, wherein said steps (a) and (e) are carried out such that the emission of the pulsed light wavefront is synchronized to occur at least in part within the sensor's integration time.

3. The method of claim 1, wherein said pulsed light wavefront is emitted in pulses having a duration shorter than said integration time.

4. The method of claim 1, wherein said step (c) is carried out with a ramping scanning mechanism.

5. The method of claim 2, wherein said step (c) is carried out with a ramping scanning mechanism.

6. The method of claim 3, wherein said step (c) is carried out with a ramping scanning mechanism.

7. The method of claim 1, wherein said step (a) is carried out with a pulsed LED.

8. The method of claim 1, wherein said step (a) is carried out with a pulsed laser.

9. The method of claim 1, wherein said step (a) is carried out with a pulsed arc lamp.

10. The method of claim 1, wherein the interferometric measurements are carried out with a microscope objective.

11. A method of reducing loss of fringe modulation during interferometric measurements of a test surface of an object, comprising the following steps:

(a) emitting a light wavefront;

(b) splitting the light wavefront into a test beam directed to the test surface and a reference beam directed to a reference surface;

(c) producing multiple optical path differences between the reference beam and the test beam; and (d) detecting a combination of wavefronts reflected from the reference surface and the test surface on a light-intensity sensor having a predetermined periodic integration time;

wherein said integration time corresponds to a maximum phase shift of the light wavefront of about $\pi/2$ radians; and wherein the light wavefront is characterized by a constant amplitude.

12. The method of claim 11, wherein said Step (c) is carried out with a ramping scanning mechanism.

13. The method of claim 11, wherein said step (a) is carried out with a halogen lamp.

14. The method of claim 11, wherein the interferometric measurements are carried out with a microscope objective.

* * * * *

UNITED STATES PATENT AND TRADEMARK OFFICE
CERTIFICATE OF CORRECTION

PATENT NO. : 6,556,305 B1
DATED : April 29, 2003
INVENTOR(S) : Aziz et al.

It is certified that error appears in the above-identified patent and that said Letters Patent is hereby corrected as shown below:

Column 6,
Line 67, replace "spitting" with -- splitting --

Column 7,
Line 1, replace "(a)" with -- (c) --

Signed and Sealed this

Fifteenth Day of July, 2003

JAMES E. ROGAN
*Director of the United States Patent and Trademark Office*